June 12, 1956 M. PFEIFFER 2,750,112

DIVIDING MACHINES

Filed Sept. 1, 1953 5 Sheets-Sheet 1

Inventor:
Max Pfeiffer
By [signature]

June 12, 1956 M. PFEIFFER 2,750,112

DIVIDING MACHINES

Filed Sept. 1, 1953 5 Sheets-Sheet 2

Inventor:
Max Pfeiffer
BY [signature]

Inventor:
Max Pfeiffer
By [signature]

June 12, 1956 M. PFEIFFER 2,750,112

DIVIDING MACHINES

Filed Sept. 1, 1953 5 Sheets-Sheet 4

Inventor:
Max Pfeiffer

BY [signature]

June 12, 1956 M. PFEIFFER 2,750,112

DIVIDING MACHINES

Filed Sept. 1, 1953 5 Sheets-Sheet 5

Inventor:
Max Pfeiffer
By 2,750,112
Patented June 12, 1956

2,750,112

DIVIDING MACHINES

Max Pfeiffer, Nurnberg, Germany, assignor to Michael Maul, Schwabach, Bavaria, Germany Application September 1, 1953, Serial No. 377,899
Claims priority, application Germany September 11, 1952
7 Claims. (Cl. 235—61.7)

Figure 1:
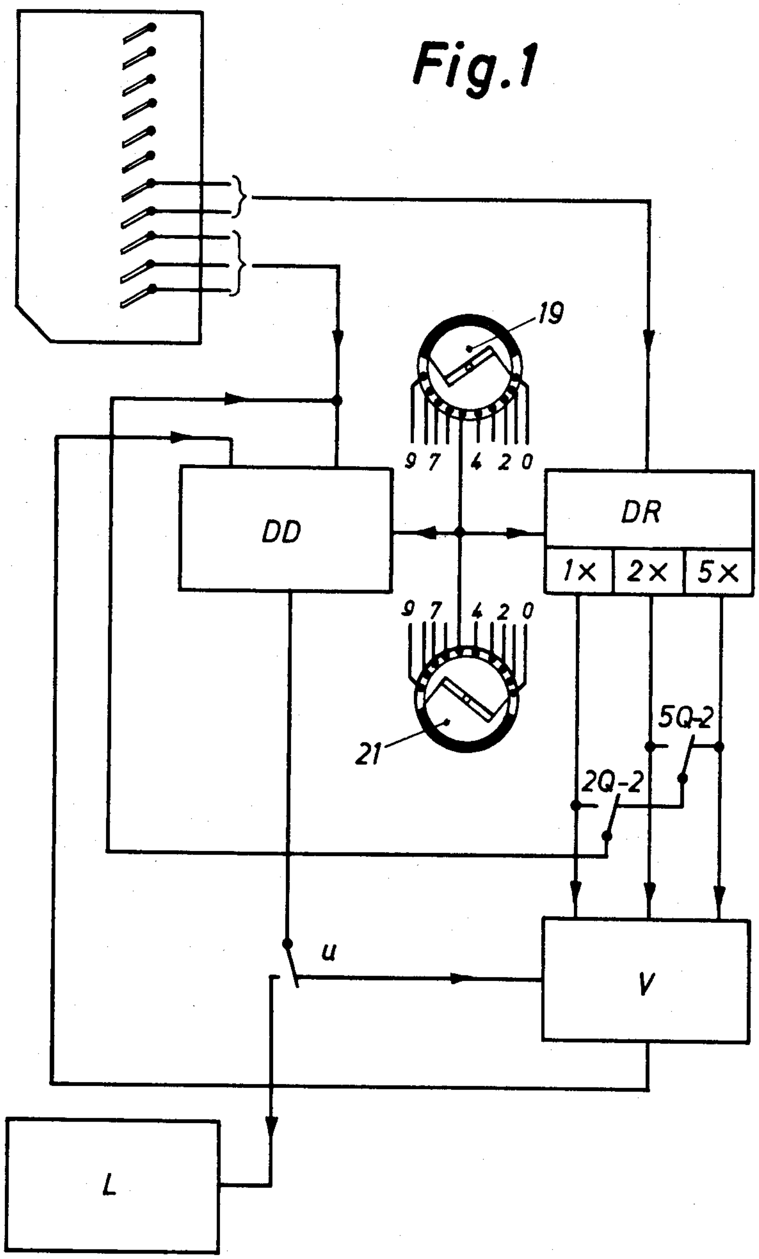

The simplest method of effecting division by machinery consists in the repeated subtraction of the divisor from the dividend and in counting in the quotient mechanism the numbers of subtraction operations. This manner of operation starts with the subtraction of the divisor from the respective highest denominations of the dividend. The remainder left in the dividend accumulator after each subtraction of the divisor is called the partial dividend. If, after repeated subtraction of the divisor, the partial dividend has become smaller than the divisor or equal to zero in those denominations in which subtraction has been effected, a "column shift operation" must take place. The signal for this column shifting can, however, be derived from the fact that the partial dividend has become zero or has passed below zero. In order to obtain the signalling at all, it is, however, necessary to carry on the subtraction so far until the partial dividend has become negative, and then in a correction cycle the divisor must again be added to the partial dividend, and it is only thereupon that the column shifting operation can take place. By this column shifting the divisor is moved to the right for one denomination with respect to the dividend mechanism, and on the other hand the number of subtraction operations is entered into the next lower denomination of the quotient mechanism.

A further method of effecting division by machinery consists in that all nine multiples of the divisor are formed and that the dividend is compared with these divisor multiples. Before starting the division proper the first to the ninth multiple of the divisor are formed and there is subsequently determined which highest possible multiple may be subtracted from the dividend or the partial dividend respectively. This multiple then indicates the quotient which is stored in the quotient accumulator. After the subtraction of the highest possible multiple there is effected in any event a column shift operation without requiring a preceding correction cycle since due to the selection method the signal for the column shifting operation does not depend on the reaching or passing below zero in the partial dividend. If, it is, however, already determined upon comparison that the partial dividend is smaller than the divisor, column shifting can immediately take place without any preceding subtraction (and accordingly also without a subsequent correction cycle). A machine operating according to this method is for instance described in U. S. Patent 2,243,473.

The first mentioned method requires for the purpose of division only small amount of mechanism but on account of the repeated subtraction this method has the disadvantage of a slow operating speed. Since in the second method the quotient is derived only from a comparison and since moreover, in addition to the effecting of the comparison, only a single subtraction cycle is necessary, this second manner of operation permits a considerably faster operating speed. This is, however, attained at the price of considerably more extensive mechanical means since the first to the ninth multiple of the divisor must be formed and since the comparison must extend over all denominations of all divisor multiples, if it is to be avoided that signalling for the column shifting must be obtained by reaching zero or passing below zero of the partial dividend and if also the correction cycle necessarily connected therewith shall be avoided.

In order to avoid the disadvantages present in the second mentioned method and consisting in the extension of the comparison over all multiples in all denominations, it is possible according to a third method (for instance according to that described in U. S. Patent No. 2,615,624) to use a smaller number of divisor multiples and to restrict the comparison to the highest denominations of the divisor multiples. If necessary, the multiples are repeatedly subtracted from the same partial dividend and the ordinal number of the multiple (for instance of the second or the fifth multiple) is entered into the quotient mechanism for the purpose of obtaining the quotient. In this third method, however, due to the restriction of the comparison upon the highest denominations, a signalling for the column shifting operation can only be derived from the zero setting of the partial dividend or from the passing below zero of the same and this again necessitates the provision of a store passing below zero and causes the loss of time involved by the correction cycle.

Now, the present invention provides a dividing machine combining the advantages of the above mentioned second and third method. Therefore, the invention may be applied in connection with a machine forming all nine multiples and permits then the restriction of the comparison to the highest denominations of the divisor multiplied by two to the divisor multiplied by nine; or it may be applied to a machine having a restricted number of multiples and avoiding then the signalling for the column shifting operation by a storing mechanism passing below zero and avoiding therewith also the correction cycle.

The above mentioned advantages are obtained, according to the present invention, in that before each selection and subtraction of a divisor multiple the comparing device compares at first the partial dividend with all denominations of the divisor multiplied by unity and determines if the partial dividend is smaller, equal or higher than the divisor multiplied by unity, and that a column shifting operation caused by said comparison is only effected if the partial dividend is smaller than the divisor multiplied by unity whereas otherwise the comparison by means of the comparing mechanism is effected only over the highest denominations of the divisor multiples and that in accordance with the comparison in the highest denominations the divisor multiple is selected for the subtraction operation being closest but smaller than the partial dividend whereas the equal or the higher divisor multiples are not selected. Since according to the invention always the smaller but never (as for instance in the second mentioned method) the equal divisor multiple is selected for subtraction it will be seen that after repeated subtraction there will always be available in the last phase of the division a partial dividend between zero and the divisor multiplied by unity. Since this partial dividend is compared through all decimal denominations with the divisor multiplied by unity it may be determined right away if a column shifting operation must take place and the signal for column shifting need not be made dependent on passing below zero of the partial dividend.

The device according to the invention may be applied in the method using nine different divisor multiples, however, with the restriction of the comparison to the highest denominations, but it affords particular advantages if applied to a restricted number of multiples since then also the comparing device is reduced in a corresponding manner. Upon application of the invention in the first mentioned instance, also, a repeated subtraction could take place due to the comparison being restricted to the highest denominations and being therefore incomplete. As compared therewith, in the second mentioned application of the invention, the number of the subtraction operations is higher, but the number of the divisor multiples is lower.

Upon the application of a restricted number of divisor multiples the repeated subtraction can be effected in a known manner in such a way that depending upon the comparison the same multiple is repeatedly subtracted from the same dividend denominations; however, also different multiples may be subtracted one by one and finally it is possible to combine both operations.

A particularly favourable solution is obtained if in a known manner only three storing devices for the divisor multiples are provided and if the multiples are so chosen that out of the digits 1 to 9 only two of the same are a total of the ordinal numbers of three multiples while the remaining digits cannot comprise more than two ordinal numbers of the multiples. This is for instance the case if the divisor multiplied by unity, the divisor multiplied by two and the divisor multiplied by five are formed as divisor multiples and are stored in the storing device.

In the example now described, a preferred dividing machine controlled by punched cards is illustrated; it may however readily be seen that the machine according to the invention may just as well be equipped with a key control instead of a punched card control and that the representation of the quotient may be effected by accumulator or type wheels instead of perforations in a card. The described embodiment is based, as regards its mechanisms, on the machine according to the U. S. Patent 2,243,473 (German Patent 746,267) without being, however, restricted to such mechanisms. The full knowledge of this patent is therefore presupposed in the further description. To facilitate the comparison for corresponding parts or functions the same reference numbers as in the above mentioned patents have also been chosen in the following description.

Figures 2, 3:
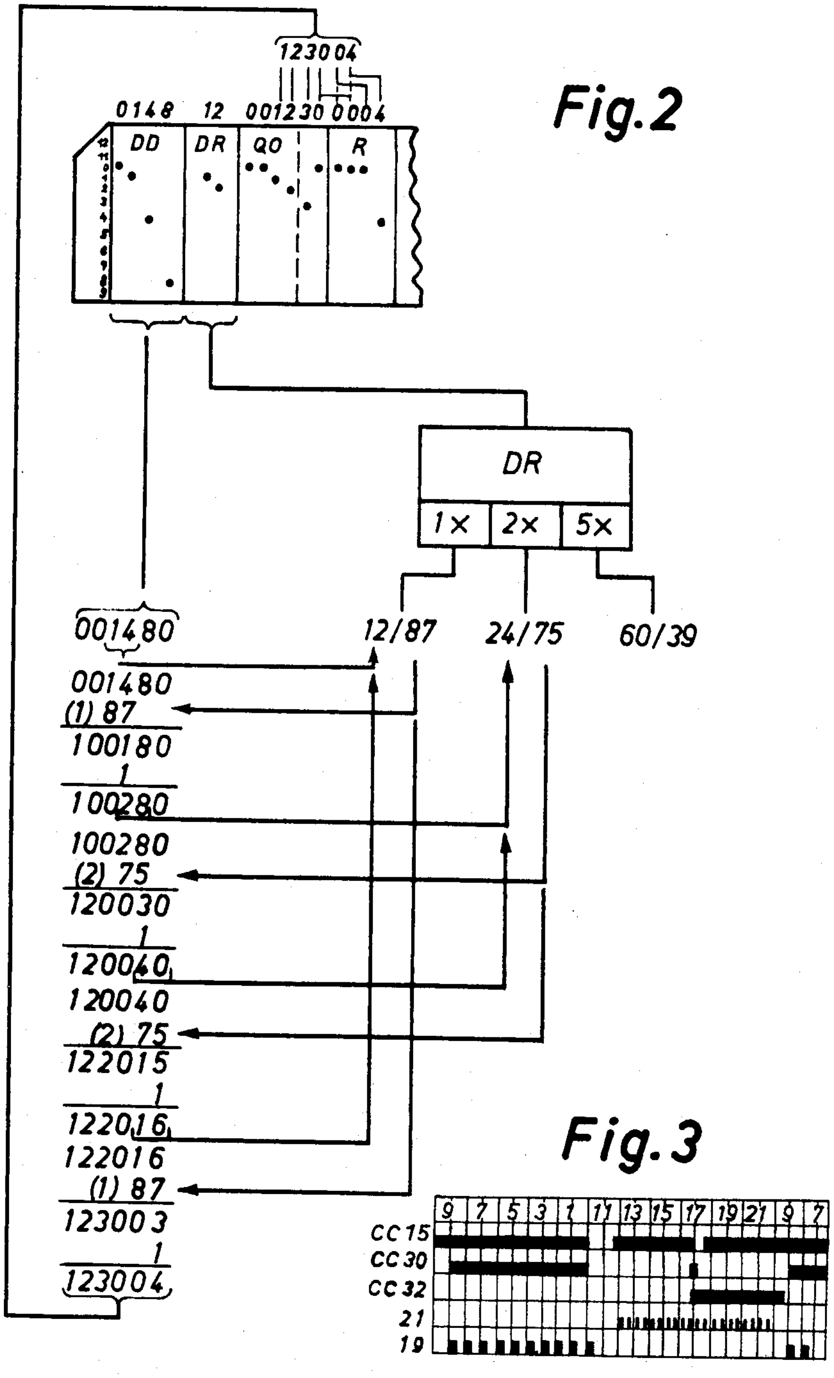
Figure 4:
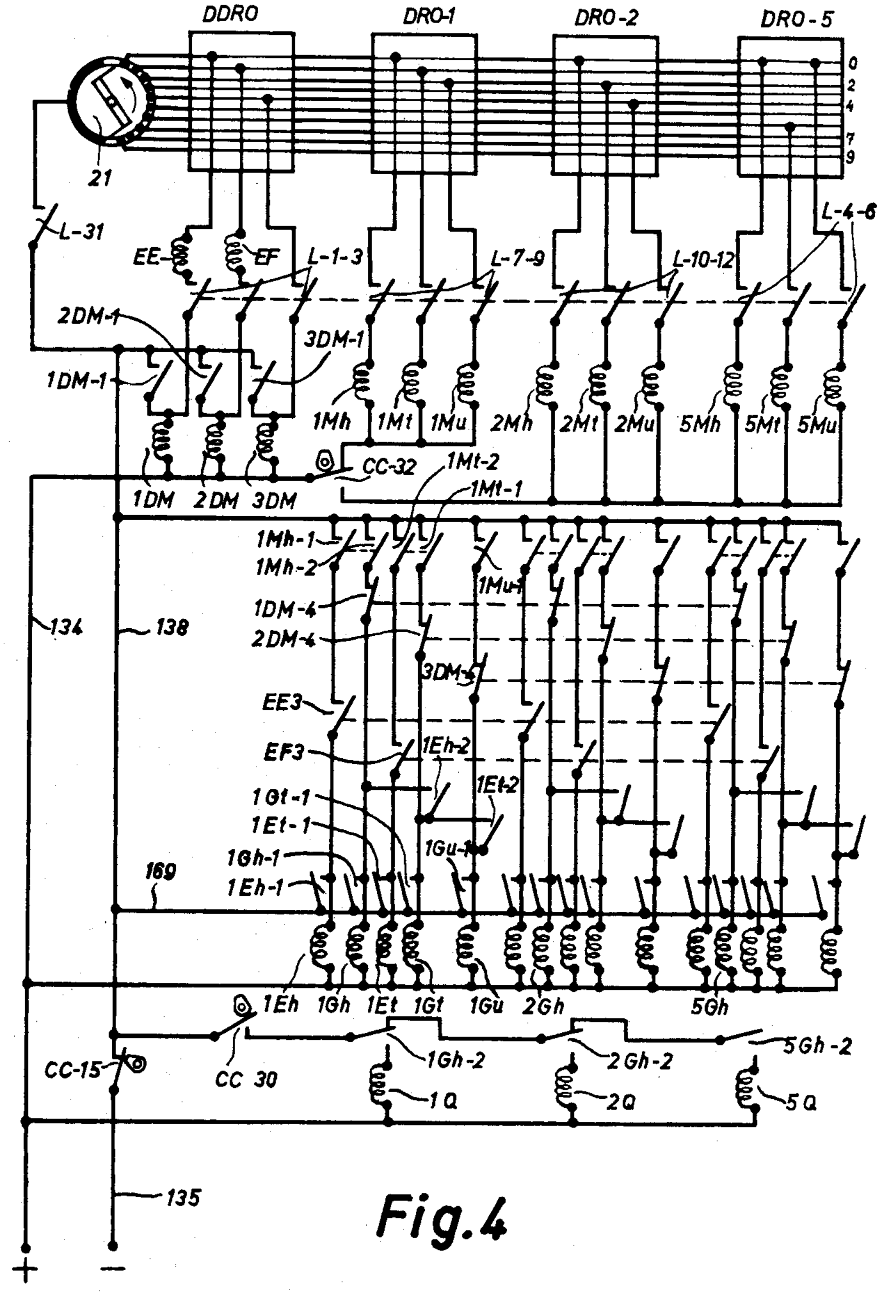
Figure 5A:
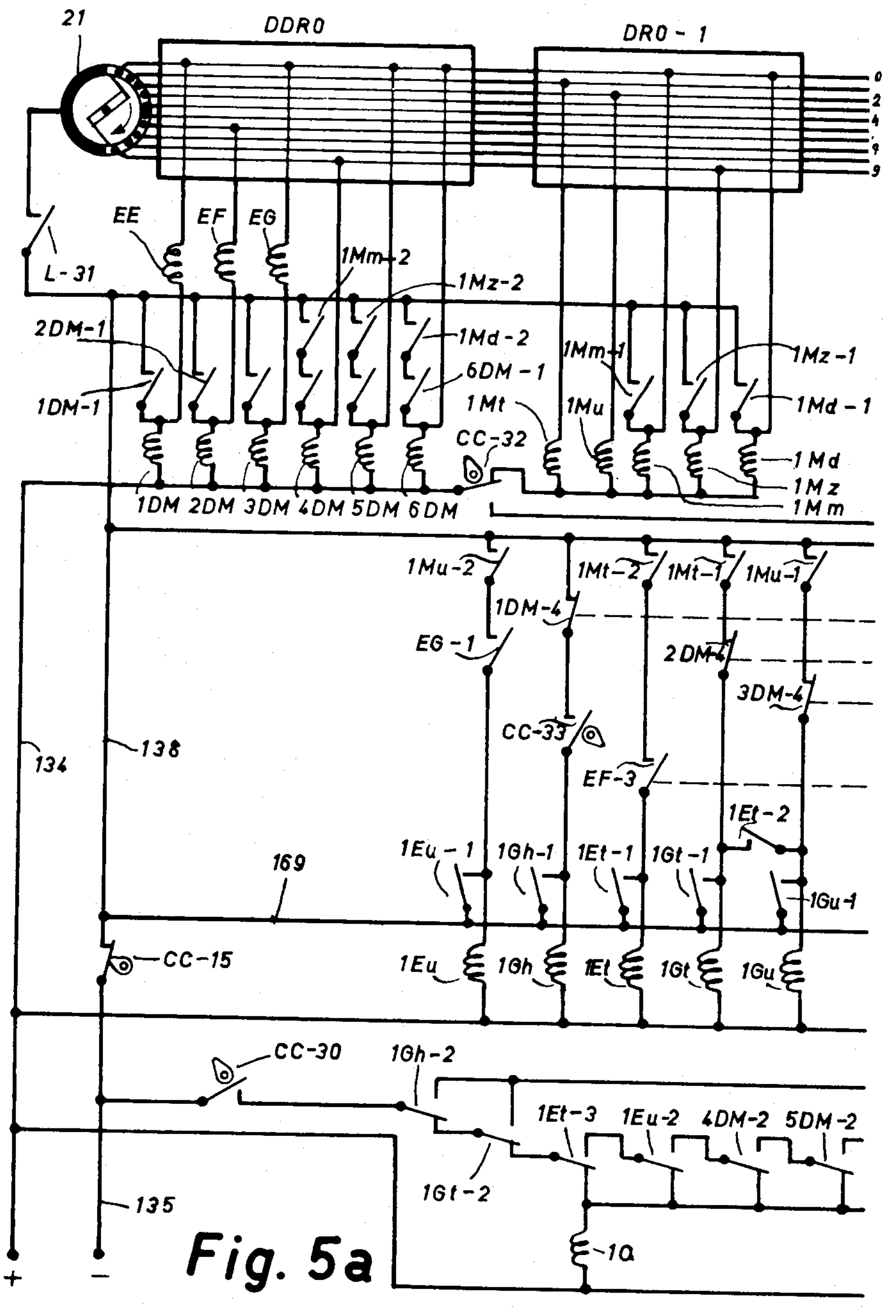
Figure 5B:
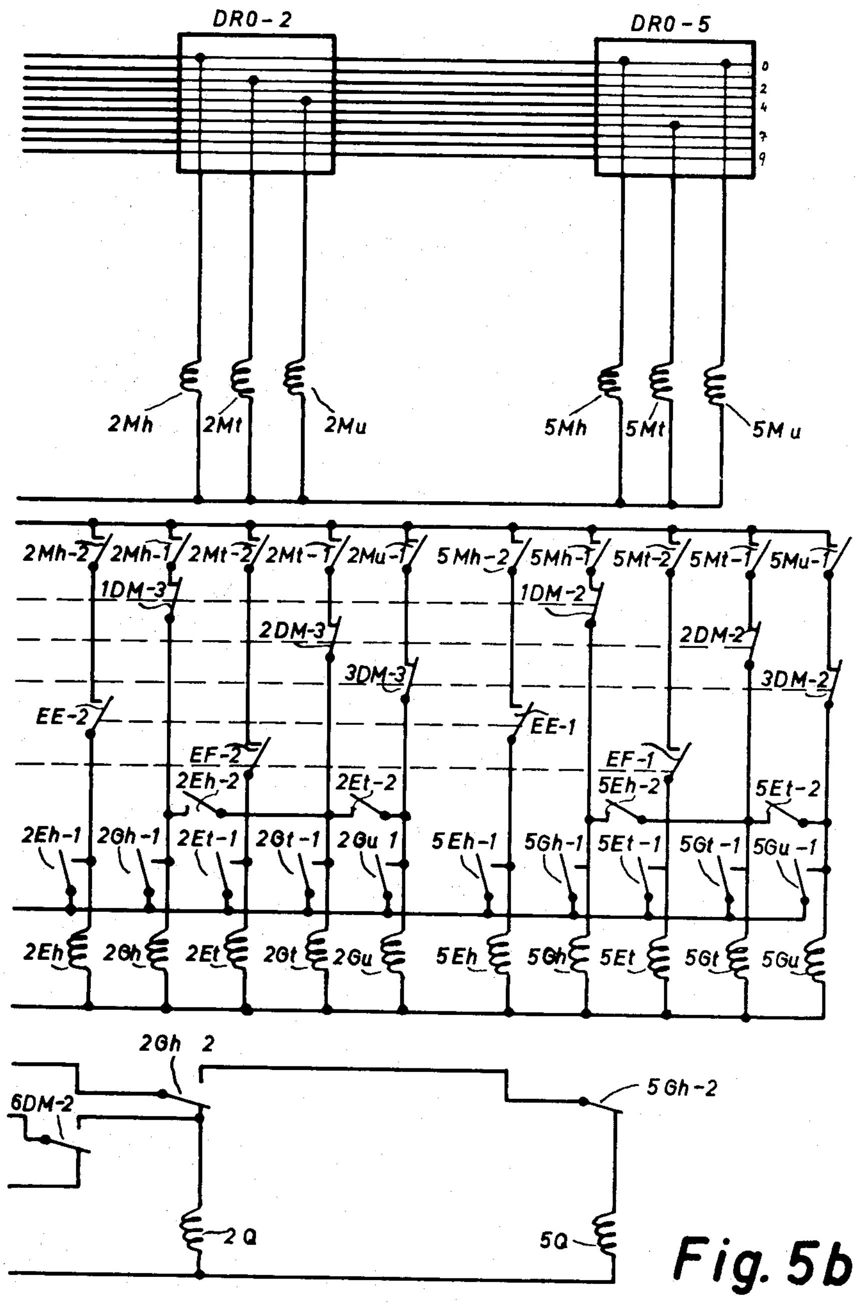

The accompanying drawings illustrate:

Fig. 1 an operating diagram of the various members of the machine;

Fig. 2 a diagram showing a divisional operation in tabular form and illustrates flow of data in the course thereof;

Fig. 3 a cam diagram;

Fig. 4 a part of a wiring diagram which part is an amplification of the wiring diagram of the U. S. Patent 2,243,473 and which represents the comparing device;

Figs. 5*a* and 5*b* which must be put side by side illustrate the wiring diagram of a simplified comparing device which is particularly suitable for divisions with a relatively large number of digits.

The dividend is analyzed from a punched card (Fig. 1) by brushes and is entered into an accumulator indicated at DD. At the same time also the divisor is analyzed and is entered into the accumulator DR. The accumulator DR is so constructed that it is capable of reading out the first, second and fifth multiples of the divisor on the analyzing devices for the accumulator setting.

When the transfer of the analysis from the punched card to the accumulators has been completed the dividend is compared in a known manner in the comparing device V with the three divisor multiples. Comparing is controlled by an impulse emitter 21 which emits its impulses to the accumulators DD and DR. The comparing device V determines with respect to the first partial dividend the highest possible divisor multiple which is present. If the partial dividend is smaller than the fifth multiple, in the comparing device a relay 5Q responds which shifts its contact 5Q–2 and thereby connects to the dividend accumulator DD the next lower divisor multiple which is present in the machine which multiple is the divisor multiplied by two.

In the subtraction cycle, which now follows, the impulse emitter 19 sends impulses to the accumulator DR in such manner that the complementary values of the divisor multiples appear on the analyzing commutators. The complement of the selected multiple is now added to the partial dividend in the dividend accumulator DD and afterwards a fugitive unit is added whereby the subtraction of the multiple from the partial dividend is caused. At the same time the comparing device forwards to the first denominational element of the dividend accumulator the ordinal number of the divisor multiple to be subtracted, said first denominational element being never occupied by a dividend digit. Accordingly, the dividend accumulator is at the same time used for the entering of the quotient. If the partial dividend is smaller than twice the divisor the contact 2Q–2 is shifted and therewith the divisor multiplied by unity is subtracted from the partial dividend.

If it is determined in the comparing device that the partial dividend is smaller than the divisor multiplied by unity, shifting of the divisor or of its multiples respectively, with regard to the dividend is effected for one digit. The comparing device has herein so been constructed that in the interval between two subtraction cycles the first half is used for the comparing in which it is determined whether the partial dividend is smaller or greater than the divisor multiplied by unity while the second half is used for the selection proper of the divisor multiple.

When the division is finished the contact *u* is shifted and the setting of the accumulator DD in which there is now only left the quotient and the remainder is transferred to the punching device L whereupon the quotient and the remainder are punched into the card.

The construction and the operation of the analyzing device as well as of the accumulators DD, DR, of the comparing device V and of the punching device are known and will therefore not be described in detail.

As may be seen from an operating diagram as illustrated in Fig. 2 the carrying out of calculation by way of example will be explained as it takes place in the machine according to the invention. In order to render the comparison easier in the present instance the same numbers as in the U. S. Patent 2,243,473 have been chosen. In the card the dividend 0148 and the divisor 12 are punched. In the first operating cycle the dividend is entered into the accumulator DD and the divisor into the accumulator DR. In the operating cycle which now follows the partial dividend 14 is compared with the divisor multiple. It is hereupon determined that 14 is higher than the divisor 12 multiplied by unity but smaller than said divisor multiplied by two whereupon the nines-complement of 12, namely 87, is added to the partial dividend. The tens transfer is interrupted before the highest digit of the partial dividend. Simultaneously therewith the ordinal number of the multiple now to be subtracted, namely 1, is entered into the first denominational element of the accumulator DD. Subsequently after addition of the numeral 87 and the numeral 1 the accumulator contains the numeral 100180. Now adding of a fugitive unit follows whereby the numeral in the accumulator DD is changed to 100280. At this point the second operating cycle is finished.

In the first half of the interval up to the next subtraction cycle it is determined whether the partial dividend has become smaller than the divisor multiplied by unity. In this instance the partial dividend amounts to 2 which is smaller than the divisor multiplied by unity and therewith a shifting by one place to the right is effected so that now the partial dividend amounts to 28. The latter is now compared with the divisor multiple thereby determining that 28 is higher than twice the divisor but smaller than the quintuple of the divisor. Now the nines-complement of 24, namely 75 is added to the partial dividend. At the same time entering of the ordinal number 2 into the second denominational element of the accumulator DD is effected. After adding of the fugitive unit the accumulator DD contains the number 120040.

Now in the first half of the interval it is again determined whether the partial dividend has become smaller than the first multiple. The partial dividend is 4; this is smaller than the divisor multiplied by unity and therefore a column shift operation to the right is again effected so that the partial dividend now amounts to 40. The latter is compared with multiple of the divisor whereupon 24 is determined to be the highest possible divisor multiple which is present, whereupon again the nines-complement 75 is added to the partial dividend and the ordinal number 2 to the third denominational element of the accumulator DD. After addition of the fugitive unit the number 122016 is in the accumulator DD. In the first half of the interval comparison is again effected as to whether the partial dividend has become smaller than the divisor multiplied by unity. Since in this instance the partial dividend has become 16 it is greater than the divisor 12 multiplied by unity and consequently no column shifting will take place. In the second half of the interval it is now determined that the divisor 12 goes once into the partial dividend 16. The nines-complement, namely 87, is added to the partial dividend and the ordinal number 1 in the third element of the accumulator DD. After addition of the fugitive unit the number 123004 is now in the accumulator DD. The numeral 123 represents the quotient while the number 4 indicates the remainder. These two numbers may then be transferred in a known manner to the record card by means of a punching device with the corresponding selection of the perforation column.

If the operating cycles of the example described herein are compared with the operating cycles of the example described in the U. S. Patent 2,243,473 it will be recognized that as compared with the known machine, with small storing mechanism and comparing devices one machine cycle has been saved, the same calculating speed having been assumed in both machines, since they operate with the same calculating elements.

With the aid of the diagram (Fig. 3) and of the wiring diagram (Fig. 4) the operation of the comparing mechanism for the machine described herein will briefly be referred to. The wiring and the diagram are based, as regards their construction, on the U. S. Patent 2,243,473 and only those shifting devices have been illustrated in which any change has been made. In all other parts the machine described herein is the same as that described in the U. S. Patent 2,243,473 from which those devices which are not required for the machine described herein may be omitted. To such devices belong above all the remaining storage devices for the representation of the divisor multiples, the associated comparing means as well as the controlling means provided to form the remaining multiples. In the wiring diagram are illustrated in a simplified manner the analyzing place DDRO of the dividend and the three analyzing places DRO–1, DRO–2, DRO–5 of the storage device DR for the divisor and their settings with respect to the impulse emitter 21. Their actual wiring may be seen from the U. S. Patent 2,243,473 already mentioned above.

It is now assumed that the divisor and the dividend had already been entered in the accumulators DR and DD respectively, and that now a comparison between the partial dividend 014 and the divisor multiples 012, 024 and 060 is to take place.

The impulse emitter 21 is so constructed and connected to the drive of the machine that it rotates once during the interval between two subtraction cycles. It therefore emits twice consecutively the impulse sequences 9 to 1 to the analyzing devices of the accumulator. During the first impulse sequence only the analyzer place for the first multiple of the divisor, namely DRO–1, is connected through the cam contact CC–32. In the next following impulse sequence the various positions of the storage device DR–1 are compared one after the other with those of the accumulator elements of the accumulator DD. The first impulse which may be transferred from the impulse emitter 21 through the commutator DDRO of the accumulator DD or the commutator DRO–1 of the storage device DR–1 respectively, passes through the fourth position of the units places of the analyzing place DDRO. The impulse will further pass through the now closed contact L–3 to the magnet 3DM which responds and establishes a holding circuit through the contact 3DM–1; moreover the contact 3DM–4 is opened. The next impulse now passes through the second position of the units places of the analyzing place DRO–1, through the closed contact L–9 to the magnet 1M*u*, which responds temporarily and closes its contact 1M*u*–1. This has, however, no influence on the machine since this current path has already been interrupted through the contact 3DM–4.

Now, at the next step of the impulse emitter simultaneously an impulse is released in the units position of the tens place of the analyzer place DDRO as well as of the analyzer place DRO–1. From the analyzing place DDRO this impulse is further transferred through the relay EF, through the closed L–2 contact and the relay 2DM to the conductor 134. The relay EF responds temporarily, as also does the relay 2DM which remains effective through its contact 2DM–1. At the same time the impulse is transferred by the commutator DRO–1 to the relay 1M*t* which responds temporarily. Through the responding of the relay 1M*t* the two contacts 1M*t*–1 and 1M*t*–2 are closed. The closure of the contact 1M*t*–1 has however no influence on the machine since in the meantime the contact 2DM–4 which was opened by the relay 2DM has interrupted this current path. Current may however flow through the now closed contacts 1M*t*–2 and EF–3 to the relay 1E*t* which responds and closes, with its contact 1E*t*–1, a holding circuit. Moreover the contact 1E*t*–2 is closed which has however no influence on the machine since the circuit has been interrupted by the contacts 2DM–4 and 3DM–4.

Now, an impulse will also be caused in the zero-position of the hundreds denomination of the two analyzing places DDRO and DRO–1, whereby the relay EE and the relay 1DM respond temporarily. The relay 1DM remains energized through its contact 1DM–1. By the responding of the relays EE and 1DM the contact 1DM–4 is opened and the contact EE–3 is closed. At the same time an impulse flows from the commutator DRO–1 to the relay 1M*h* which responds temporarily and closes its contacts 1M*h*–1 and 1M*h*–2. No current can however flow to the relay 1G*h* since the circuit has been interrupted by 1DM–4, opened by relay 1DM. The relay 1E*h* receives current since now the two contacts 1M*h*–2 and EE–3 have closed. Responding of the relay 1E*h* has, however, no effect on the machine since the circuits through the contact 1E*h*–2 are interrupted through the contact 1DM–4. Therefore the relays 1E*h* and 1E*t* have responded while the relays 1G*u*, 1G*t* and 1G*h* have not been energized. If for instance the partial dividend were smaller than the divisor, an impulse would first be conducted through the commutator DRO–1 in the respective denomination before it is conducted through the commutator DDRO. In the case of the units denomination closing of the contact 1M*u*–1 would therefore be effected sooner than opening of the contact 3DM–4, so that the relay 1G*u* responds and holds itself through its contact 1G*u*–1. If it is assumed that the tens and hundreds denominations in both accumulators DDRO and DRO–1 are similar, the relays 1E*t* and E*h* respond one after the other, as has already been described above. Through the now closed contacts 1G*u*–1, 1E*t*–2 and 1E*h*–2 the two relays 1G*t* and 1G*h* receive current from the conductor 169, so that they are energized and hold themselves through their contacts 1G*t*–1 and 1G*h*–1.

As a rule for this comparing means may be considered: If in one denomination the divisor is greater than the partial dividend, the associated relay 1G*u*, 1G*t* or 1G*h*, respectively, responds. On the other hand if the values in the denominations are equal the associated relays 1E*t* or 1E*h*, respectively, respond and transfer with their contacts 1E*t*–2 and 1E*h*–1 the position of the next lower denomination relay 1G*u* or 1G*t*, respectively, to the associated denominational relay 1G*t* or 1G*h*, respectively. Responding of the relay 1G*h* now indicates in this comparing mechanism whether the partial dividend is smaller than the divisor multiplied by unity. If the relay 1G*h* has not responded the partial dividend is higher than the divisor multiplied by unity. If on the other hand the relay 1G*h* had, for instance, been energized it would have shifted its contact 1G*h*–2, thus preparing the current circuit to the relay 1Q. At the end of this impulse sequence the cam contact CC–30 closes temporarily thereby energizing the relay 1Q which controls in a known manner the column shift operation. If on the other hand the relay 1G*h* has not responded upon closure of the cam contact CC–30 the relay 1Q cannot respond and consequently no column shifting can be effected.

In the second series of impulses from the impulse emitter 21 which now follow, the cam contact CC–32 disconnects the analyzing place DRO–1 and connects instead thereof the two analyzing places DRO–2 and DRO–5.

Now in the second half of the interval the two analyzing places DRO–2 and DRO–5 are compared with the analyzing place DDRO in a similar way as for the analyzing place DRO–1 in the first half of the interval. For reasons of clarity the reference numbers at the contacts and relays of the two last mentioned comparing mechanisms have been omitted since they are constructed in exactly the same way as the first one which has been described above. In the second half it is determined whether the partial dividend is smaller than twice the divisor or the quintuple of the divisor. If the partial dividend is smaller than twice the divisor the relay 2G*h* responds, and shifts its contact 2G*h*–2 thereby preparing the circuit for the relay 2Q.

When the series of impulses is finished the cam contact CC–30 closes again thereby energizing the relay 2Q and shifting its contact 2Q–2 (Fig. 1). Thus the nines-complement of the divisor is entered in the accumulator DD as has already been described above. The same relates to the current paths through the commutator DRO–5 whereby the relay 5Q is energized if the partial dividend is greater than twice the divisor but smaller than the quintuple of the divisor. If the partial dividend is greater than the quintuple neither the relay 2Q nor the relay 5Q will respond whereby the complement of the quintuple of the divisor is entered into the accumulator DD.

Finally a simplified comparing mechanism is still to be described as the operation according to the invention makes it possible. Its advantage may particularly be seen in that also with a large number of digits it is possible to work with a small amount of mechanism as regards the comparing mechanism. The simplified comparing mechanism is constructed in a way similar to the one described above, the difference is only to be seen in that with respect to the comparing mechanism described above not all digits of the divisor multiples may be employed for the comparison, but only the highest digits two or three, respectively, while the remaining digits are not considered for the comparison.

The comparing mechanism is so constructed that it determines whether the first denominations of the partial dividend are equal or smaller, respectively, than the first denominations of the divisor multiples or whether they are larger than said multiples. If the comparing mechanism determines that the first denominations of the partial dividend are equal or smaller, respectively, than the denominations of a divisor multiple the next lower multiple is selected for the subtraction operation. Consequently, it is thereby always avoided that after a subtraction operation the remainder becomes smaller than zero or that it receives a negative sign. If upon comparison due to the unconsidered digits a multiple is obtained which is too small and if therewith a larger remainder occurs in the dividend accumulator this mistake is adjusted in the next comparison operation or subtraction operation, respectively, by a correspondingly larger multiple, or in a given case the machine inserts automatically an additional operating cycle, as will still be shown in an example described later on.

For this marginal case the quotient is then formed by a plurality of lower multiples, though it had been also possible to form the quotient by a higher multiple available in the machine. Accordingly, the digits which have not been used in the comparison are taken into consideration in the next operating cycle, without requiring an additional controlling device. The additional operating cycles which possibly may arise by such marginal cases are of little importance for the operating speed of the machine since probably such marginal cases rarely occur. If it is assumed that the first two digits of the divisor multiples are to be used for the comparison the probability of marginal cases arising is one per cent. Even upon the comparison with only one digit which simplifies the device considerably there is still a probability of ten percent which therefore would mean that the machine with a simplified comparing mechanism requires on the average only $\frac{1}{10}$ more of the time needed with a machine having a complete comparing mechanism.

Only for the lowest multiple, the divisor multiplied by unity, a checking mechanism has been provided which determines whether the partial dividend is in all positions equal to or higher than the divisor. This is necessary in order that in case of congruency of the dividend and the divisor the division may immediately be concluded. Otherwise the quotient conditioned by the unconsidered digits would theoretically be constituted by a series of subtraction cycles continuing ad infinitum.

With the aid of an example it will be shown how the machine operates with the simplified comparing mechanism in the marginal cases in which, conditioned by the unconsidered digits, a smaller multiple is selected than could normally be used. It will here be assumed that the first two digits of the divisor multiple are used for the comparison

| | | |
|---|---|---|
| 609000 : 1209= | | |
| −2418 | 2 | → 200 |
| 3672 | | |
| −2418 | 2 | → 400 |
| 12540 | | |
| − 6045 | 5 | → 450 |
| 6495 | | |
| − 6045 | 5 | → 500 |
| 4500 | | |
| − 2418 | 2 | → 502 |
| 2082 | | |
| − 1209 | 1 | → 503=Quotient |
| 873=Remainder | | |

In the first comparison the first two denominations of the dividend, namely 60 are compared with the first two denominations of the divisor or of its multiples respectively. It is herein determined that 60 corresponds to the quintuple of 12 whereby the comparing mechanism selects the second multiple for the subtraction cycle. Accordingly the numeral 2418 is subtracted from the dividend. Subsequently thereto the comparison is again effected namely of the numeral 36 with the multiples. Said numeral is higher than twice 12 so that again the second multiple of the divisor is subtracted from the partial dividend which results in the numeral 1254. During these two subtraction cycles no column shifting takes place so that the two ordinal numbers of the multiples add up to 4 in the respective denomination of the quotient mechanism.

In the next comparison it is determined that the value of the first two denominations of the partial dividend is identical with the value of the first two denominations of the divisor. In this instance also the following denominations are made use of for the comparison, since the first multiple of the divisor is concerned, for which purpose provision has been made in such way that each following denomination of the partial dividend is checked, whether it is identical with or greater than the value of the corresponding denomination of the divisor. In the third denomination the corresponding numeral would be 5 for the partial dividend and 0 for the divisor whereby 5 is determined to be greater than 0. In the fourth denomination, however, there is the numeral 4 in the partial dividend and numeral 9 in the divisor. In this instance the partial dividend denomination is smaller than the divisor denomination so that the comparing mechanism initiates a column shift operation.

Now the first denominations of the numeral 12540 are referred to for the comparison. Herein the quintuple of the divisor is determined to be the highest possible multiple for the subtraction cycle and is subtracted so that now a partial dividend 6495 will result. The ordinal number 5 is entered into the quotient mechanism under consideration of the column shifting so that now the numeral 450 is in the quotient mechanism. In the following subtraction cycle also the quintuple of the divisor is determined and is subtracted from the partial dividend so that a remainder of 450 is left in the dividend accumulator. In the quotient assumulator again the ordinal number 5 is added thus increasing the value in the quotient accumulator to 500.

The following comparison determines that the partial dividend is smaller than the divisor so that a column shift operation will be initiated. The new partial dividend now amounts to 4500. In the now following comparison of the first two denominations it is determined that the second multiple of the divisor may be subtracted from the partial dividend as the highest possible multiple. The ordinal number 2 is entered into the quotient mechanism under consideration of the respective column shift operation. Due to the subtraction cycle in the dividend accumulator a partial dividend of 2082 occurs for which the highest possible multiple of the divisor, namely the units is selected and subtracted. In the dividend accumulator there is now a remainder of 873 and in the quotient mechanism the value 503 which represents the quotient of the aforesaid division. Under consideration of the respective controlling operations these two values are subsequently punched into the card.

With the aid of the wiring diagram in Figs. 5*a* and 5*b* which are to be put side by side it will now also briefly be explained how the simplified comparing mechanism operates. The latter is constructed similarly to the above described comparing mechanism, all devices having the same functions and being also designated by the same reference numbers. The comparing device proper which relates only to the first two denominations of the divisor or to the first three denominations of the divisor multiples and of the partial dividend operates in the same manner as the above described comparing device. There is a difference only in so far as the impulse sequence of the impulse emitter 21 runs in the opposite direction. Accordingly not the 9-impulse but the 0-impulse is first emitted to the analyzing commutators of the storage devices. Thereby it is determined whether the partial dividend is smaller than or equal to a divisor multiple, thus differing from the above described comparing device in which it has been determined whether the partial dividend is greater than or equal to a divisor multiple. Between the storage device of the partial dividend and the storage device of the first multiple of the divisor a mechanism has been provided in addition to the known comparing device, said mechanism checking each individual denomination of the partial dividend as to whether it is greater than or equal to the divisor.

This device is necessary in order that, in case of equality between the partial dividend and the divisor, the division is immediately finished, as has been described above. In connection with Fig. 5*a* a comparison between the partial dividend and the divisor will now be described which takes place in the first half of the interval between two subtraction cycles and wherein it is assumed that the numeral 060900 is in the dividend accumulator and the numeral 12090 in the divisor storage device.

In the first half of the interval between two subtraction cycles the cam contact CC–32 is in the indicated position. If now the impulse emitter 21 rotates, beginning with 0 impulses are emitted one after the other through the various lines through the accumulator or storing commutators respectively. At the same time the first impulse through the zero-line passes, conditioned by the respective brush or numeral setting respectively, in the commutators through the 1st, 3rd, 5th and 6th denomination of the dividend accumulator to the comparing device. Simultaneously also a 0-impulse flows through the 3rd and 5th denomination of the divisor storage device to the comparing mechanism. Accordingly the relays EE, EG, 1DM, 3DM, 5DM, 6DM, 1M*m* and 1M*d* respond simultaneously. The two relays EE and EG remain closed only temporarily during the impulse period, the relays 1DM, 3DM, 1M*m*, 1M*d* establish through their contacts 1DM–1, 3DM–1, 1M*m*–1 and 1M*d*–1 holding circuits so that these relays remain also energized after the impulse. Through the closure of the two contacts 1M*d*–2 and 6DM–1 also a holding circuit is established for the relay 6DM so that the latter will also remain energized. As regards the relay 5DM, however, the one contact 1M*z*–2 remains open since the associated relay 1M*z* had not been energized, so that 5DM drops again after ceasing of the impulse period.

Now, the difference between the two relays 5DM and 6DM is such, that 6DM indicates by remaining energized that in the two denominations of the partial dividend and divisor being associated with each other the partial dividend denomination is greater than or equal to the divisor denomination. Whereas at 5DM which has again become deenergised it is indicated that the value of the partial dividend denomination is smaller than that of the associated divisor denomination.

Due to the response of the two relays 1DM and 3DM also the respective associated contacts 1DM–2 to 1DM–4, as well as 3DM–2 to 3DM–4 have been opened. Simultaneously with the impulse emission through the one-line also the cam contact CC–33 is closed during the impulse period. This has, however, no influence upon the operation of the machine since shortly before the contact 1DM–4 has opened due to the energization of the relay 1DM If, however 1 DM were to receive an impulse at a later moment which would mean that in the highest partial dividend denomination there is no zero, the contact 1DM–4 would also have closed upon closure of the cam contact CC–33 so that the relay 1G*h* would receive current and would establish a holding circuit through its contact 1G*h*–1. With the impulse through the one-line current is also supplied through the first divisor denomination to the relay 1M*t* which response temporarily during the impulse period and which closes its two contacts 1M*t*–1 and 1M*t*–2.

In this instance the relay 1E*t* cannot respond since the current circuit is interrupted by the contact EF–3. The relay 1G*t* on the other hand responds, holding itself through its contact 1G*t*–1 since at that time the contact 1DM–4 is still closed. If the values of the two denominations were identical the two contacts 1M*t*–2 and EF–3 would close at the same time so that 1E*t* would be energized and would hold itself through its contact 1E*t*–1. If, however, the dividend denomination would be smaller than the divisor denomination neither of the two relays 1E*t* and 1G*t* would respond in this instance.

In the same manner the comparing device is also constructed for the next denomination of dividend and divisor the distinction between the different features being effected by the two relays 1E*u* and 1G*u*. The relay 1E*u* determines herein the identity of the two values while the relay 1G*u* determines whether the value of the corresponding dividend denominations is higher than the value of the respective divisor denomination. If the value of the first divisor denomination is equal to the value of the second partial dividend denomination a checking of the next lower denomination must take place whether in the latter the value is equal, smaller or higher. Such checking is effected by means of the contact 1E*t*–2.

The comparison of the following three denominations of the divisor and the partial dividend is effected through a simplified mechanism by means of relays 4DM, 5DM and 6DM and their holding circuits as has already been described above. For this device the rule may be applied: If the relay 4DM, 5DM or 6DM respectively of the respective denomination remains energized, the value of the partial dividend denomination is equal to or greater than the value of the respective divisor denomination.

These features just described which are represented by the respective relays are made use of for the control of the machine by means of the respective contacts 1G*h*–2, 1G*t*–2, 1E*t*–3, 1E*u*–2, 4DM–2, 5D*m*–2 and 6DM–2. If the two relays 1G*h* and 1G*t* have responded, they indicate that the partial dividend is already greater in the first denomination than the divisor so that they interrupt the circuit to the relay 1Q by means of the contacts 1G*h*–2 or 1G*t*–2 respectively and establish a circuit to the relay 2Q or 5Q respectively. Accordingly the relay 1Q cannot respond to initiate a column shift operation. If, however, the relay 1G*h* does not respond it is consequently indicated that the first partial dividend denomination is 0 and the contact 1G*h*–2 maintains the circuit to the relay 1Q. If the second denomination of the partial dividend and the first denomination of the divisor are equal or smaller the relay 1G*t* does not respond and its contact 1G*t*–2 maintains the circuit to 1Q.

If the above-mentioned denominations are equal the relay 1E*t* responds and interrupts by means of contact 1E*t*–3 the circuit to 1Q. In case of non-congruency, however, the circuit to 1Q is maintained. Therefore 1Q will always respond if none of the three relays 1G*h*, 1G*t* and 1E*t* has responded. In the relay chain now established by means of the contacts 1E*u*–3, 4DM–2, 5DM–2 and 6DM–2 a selection is made between the relays 1Q and 2Q. If the partial dividend in the last four denominations is equal to or higher than the divisor all five contacts (1E*t*–3, 1E*u*–2, 4DM–2, 5DM–2 and 6DM–2) have shifted, thus establishing a circuit to the relay 2Q which selects by its response the divisor multiplied by unity for the subtraction cycle. If, however, only in one of these four denominations the value of the dividend is smaller than the value of the divisor the associated contact is not shifted so that the circuit to the relay 2Q is interrupted and is maintained to the relay 1Q which responds after the closure of the cam contact CC–30 and causes the column shift operation.

The comparing devices of the higher multiples operate, as was already mentioned above, in just the same manner as the formerly described comparing device with the only difference that in the comparison the lower denominations are not considered and that only the first three denominations are referred to. This device is therefore not described in detail.

I claim:

1. In a calculating machine, an accumulator settable to represent a dividend, a storing device settable to represent the single as well as multiples of the divisor, a device for comparing the setting of said divisor storing device with the setting of said dividend representing accumulator to determine the single or multiple of the divisor being below the setting of the dividend accumulator and being closest to this setting, said comparing device comparing all digits of the single of the divisor with the dividend and comparing the highest digits of the multiples of the divisor with the dividend, column shifting devices for shifting the columns of the divisor or its multiples respectively with regard to the dividend, means for subtracting the single of the divisor or a multiple of the latter from said accumulator, said comparing device controlling successively subtraction of the single of or multiples of the divisor coming closest to the dividend accumulator setting until the setting of the dividend accumulator has become lower than the divisor and causing column shifting as soon as said lowering has taken place, and a quotient receiving accumulator under the control of said comparing device adapted to indicate the number of subtractions of said divisor from said dividend.

2. In a calculating machine, an accumulator settable to represent a dividend, a storing device settable to represent the single and multiples of the divisor, a device for comparing the setting of said divisor storing device with the setting of said dividend representing accumulator to determine the single or multiple of the divisor being below the setting of the dividend accumulator and being closest to this setting, said comparing device comparing at first all digits of the single of the divisor with the dividend and comparing then the highest digits of the multiple of the divisor with the dividend, column shifting devices for shifting the columns of the divisor or its multiples respectively with regard to the dividend, said column shifting means being rendered effective under the control of said comparing means only if the dividend accumulator setting is lower than the divisor storing device setting, and means for subtracting the single or multiples of the divisor from said dividend accumulator setting until the dividend accumulator setting has become lower than the single of the divisor storing device setting, and a quotient receiving accumulator indicating the number of subtractions of said divisor from said dividend and being under the control of said comparing device.

3. In a calculating machine, an accumulator settable to represent a dividend, a storing device settable to represent 1, 2 or 5 times the divisor, a device for comparing the setting of said divisor storing device with the setting of said dividend accumulator to determine the single or multiple of the divisor being below the setting of the dividend accumulator and being closest to this setting, said comparing device comparing all digits of the single of the divisor with the dividend and comparing the highest digits of the multiples of the divisor with the dividend, column shifting devices for shifting the columns of the divisor or its multiples respectively with regard to the dividend, means for subtracting the single of the divisor or a multiple of the latter from said accumulator, said comparing device controlling successively subtraction of the single of or multiples of the divisor coming closest to the dividend accumulator setting until the setting of the dividend accumulator has become lower than the divisor, and causing column shifting as soon as said lowering has taken place, a quotient receiving accumulator indicating the number of subtractions of said divisor from said dividend and being controlled by said comparing device.

4. In a calculating machine, an accumulator settable to represent a dividend, a storing device settable to represent 1, 2 or 5 times the divisor, a device for comparing the setting of said divisor storing device with the setting of said dividend representing accumulator to determine the single or multiple of the divisor being below the setting of the dividend accumulator and being closest to this setting, said comparing device comparing at first all digits of the single of the divisor with the dividend and comparing then the highest digits of the multiple of the divisor with the dividend, column shifting devices for shifting the columns of the divisor or its multiples respectively with regard to the dividend, said column shifting means being rendered effective under the control of said comparing means only if the dividend accumulator setting is lower than the divisor storing device setting, and means for subtracting the single or multiples of the divisor from said dividend accumulator setting until the dividend accumulator setting has become lower than the single of the divisor storing device setting, and a quotient receiving accumulator indicating the number of subtractions of said divisor from said dividend and being under the control of said comparing device.

5. In a punched card controlled calculating machine, an accumulator settable under the control of a dividend representing perforation, a storing device settable under the control of a divisor representing perforation to represent the single and multiples of the divisor, a device for comparing the setting of said divisor storing device with the setting of said dividend representing accumulator to determine the single or multiple of the divisor being below the setting of the dividend accumulator and being closest to this setting, said comparing device comparing at first all digits of the single of the divisor with the dividend and comparing then the highest digits of the multiple of the divisor with the dividend, column shifting devices for shifitng the columns of the divisor or its multiples respectively with regard to the dividend, said column shifting means being rendered effective under the control of said comparing means only if the dividend accumulator setting is lower than the divisor storing device setting, and means for subtracting the single or multiples of the divisor from said dividend accumulator setting until the dividend accumulator setting has become lower than the single of the divisor storing device setting, a quotient receiving accumulator indicating the number of subtractions of said divisor from said dividend and being controlled by said comparing device, and punching means under the control of said quotient receiving accumulator to punch the quotient into the same record which has controlled the dividend and the divisor setting.

6. In a punched card controlled calculating machine, an accumulator settable under the control of a dividend representing perforation, a storing device settable under the control of a divisor representing perforation to represent 1, 2 or 5 times the divisor, a device for comparing the setting of said divisor storing device with the setting of said dividend accumulator to determine the single or multiple of the divisor being below the setting of the dividend accumulator and being closest to this setting, said comparing device comparing all digits of the single of the divisor with the dividend and comparing the highest digits of the multiples of the divisor with the dividend, column shifting devices for shifting the columns of the divisor or its multiples respectively with regard to the dividend, means for subtracting the single of the divisor or a multiple of the latter from said accumulator, said comparing device controlling successively the subtraction of the single of or multiples of the divisor coming closest to the dividend accumulator setting until the setting of the dividend accumulator has become lower than the divisor and causing column shifting as soon as said lowering has taken place, a quotient receiving accumulator indicating the number of subtractions of said divisor from said dividend and being controlled by said comparing device, and punching means under the control of said quotient receiving accumulator to punch the quotient into the same record which has controlled the dividend and the divisor setting.

7. In a punched card controlled calculating machine, an accumulator settable under the control of a dividend representing perforation, a storing device settable under the control of a divisor representing perforation to represent 1, 2 or 5 times the divisor, a device for comparing the setting of said divisor storing device with the setting of said dividend representing accumulator to determine the single or multiple of the divisor being below the setting of the dividend accumulator and being closest to this setting, said comparing device comparing at first all digits of the single of the divisor with the dividend and comparing then the highest digits of the multiple of the divisor with the dividend, column shifting devices for shifting the columns of the divisor or its multiples respectively with regard to the dividend, said column shifting means being rendered effective under the control of said comparing means only if the dividend accumulator setting is lower than the divisor storing device setting, and means for subtracting the single or multiples of the divisor from said dividend accumulator setting until the dividend accumulator setting has become lower than the single of the divisor storing device setting, a quotient receiving accumulator indicating the number of subtractions of said divisor from said dividend and being controlled by said comparing device, and punching means under the control of said quotient receiving accumulator to punch the quotient into the same record which has controlled the dividend and the divisor setting.

References Cited in the file of this patent

UNITED STATES PATENTS

| | | |
|---|---|---|
| 2,199,537 | Campbell | May 7, 1940 |
| 2,243,473 | Bryce | May 27, 1941 |
| 2,328,623 | Dickinson | Sept. 7, 1943 |
| 2,615,624 | Brand et al. | Oct. 28, 1952 |
| 2,660,373 | Daly et al. | Nov. 24, 1953 |